(12) United States Patent
Lancto

(10) Patent No.: US 11,565,859 B2
(45) Date of Patent: Jan. 31, 2023

(54) SUPPLEMENT SHAKER APPARATUS

(71) Applicant: Garrett Lancto, Arvada, CO (US)

(72) Inventor: Garrett Lancto, Arvada, CO (US)

(*) Notice: Subject to any disclaimer, the term of this patent is extended or adjusted under 35 U.S.C. 154(b) by 0 days.

(21) Appl. No.: 17/466,816

(22) Filed: Sep. 3, 2021

(65) Prior Publication Data
US 2022/0063879 A1    Mar. 3, 2022

Related U.S. Application Data

(60) Provisional application No. 63/074,308, filed on Sep. 3, 2020.

(51) Int. Cl.
*B65D 47/08* (2006.01)
*B65D 51/28* (2006.01)
*A47J 43/27* (2006.01)

(52) U.S. Cl.
CPC .......... *B65D 51/2807* (2013.01); *A47J 43/27* (2013.01); *B65D 47/0885* (2013.01)

(58) Field of Classification Search
CPC .... B65D 51/28; B65D 51/24; B65D 51/2807; B65D 81/3283; B65D 81/3216;
(Continued)

(56) References Cited

U.S. PATENT DOCUMENTS

RE1,293 E * 3/1862 Griffing .................. 220/253
RE1,489 E * 6/1863 Towers .................. 220/253
(Continued)

FOREIGN PATENT DOCUMENTS

EP    2208686 A1    7/2010
GB    2521895 A     8/2015
(Continued)

OTHER PUBLICATIONS

BeMo "Motivational Protein Shaker"; Amazon; https://www.amazon.com/gp/product/B01N681K7H/; printed Jul. 22, 2020; 9 pages.
(Continued)

*Primary Examiner* — Frederick C Nicolas
*Assistant Examiner* — Randall A Gruby
(74) *Attorney, Agent, or Firm* — Hall Estill Law Firm

(57) ABSTRACT

A supplement shaker apparatus having a primary container for holding drinking fluid and a supplement container for holding a supplement wherein the supplement container is supported by the primary container with an opening therein. The apparatus also includes a lid assembly that is securable to the primary container and holds the supplement container in position in the supplement shaker apparatus. The apparatus further includes a spout connection element that extends from the opening in the supplement container to the lid to permit the drinking fluid to pass out of the primary container without contacting the supplement in the supplement container. A supplement shaker kit that includes a supplement container for holding a supplement wherein the supplement container is supported by a shaker bottle with an opening therein and a lid assembly that is securable to the shaker bottle and holds the supplement container in position relative to the shaker bottle. The kit also includes a spout connection element that extends from the opening in the supplement container to the lid to permit the drinking fluid to pass out of the shaker bottle without contacting the supplement in the supplement container.

12 Claims, 4 Drawing Sheets

(58) Field of Classification Search
CPC ............... B65D 41/26; B65D 47/0885; B65D 47/0895; A47J 43/27
USPC .................. 220/23.87, 253, 256.1, 212; 222/129–131
See application file for complete search history.

(56) References Cited

U.S. PATENT DOCUMENTS

| | | | | |
|---|---|---|---|---|
| 3,012,695 | A * | 12/1961 | Lerner | B65D 47/263 222/215 |
| 3,022,925 | A * | 2/1962 | Daniell | A47J 19/34 222/542 |
| D316,035 | S * | 4/1991 | Pepitone | D9/503 |
| 5,065,877 | A * | 11/1991 | Karppinen | B65D 50/06 215/235 |
| 5,609,277 | A * | 3/1997 | McDonald | A45F 5/02 224/148.1 |
| 6,065,640 | A * | 5/2000 | Ho | B05B 11/0078 40/406 |
| 6,105,819 | A * | 8/2000 | Ho | G09F 19/08 40/406 |
| 6,138,870 | A * | 10/2000 | Lin | B05B 11/0038 40/406 |
| 6,450,368 | B1 * | 9/2002 | De LaForcade | B65D 1/04 222/145.5 |
| 6,877,625 | B2 * | 4/2005 | Alley | B65D 47/265 220/360 |
| 7,866,183 | B2 * | 1/2011 | Roth | A47J 36/28 62/457.3 |
| 8,136,660 | B2 | 3/2012 | Sharon | |
| 8,333,290 | B2 * | 12/2012 | Kuwahara | B65D 51/18 220/255 |
| 8,544,674 | B2 * | 10/2013 | Nilsson | A47J 43/27 222/145.5 |
| 8,926,840 | B2 * | 1/2015 | Hull | A47G 19/2272 220/709 |
| 9,216,843 | B2 * | 12/2015 | Sorensen | B65D 81/3205 |
| D751,344 | S * | 3/2016 | Charlton | D7/300.1 |
| 9,463,899 | B2 * | 10/2016 | Strominger | B65D 21/0209 |
| 9,463,913 | B2 * | 10/2016 | Strominger | A47G 19/065 |
| 9,549,633 | B2 * | 1/2017 | Ng | A47J 43/27 |
| 9,724,629 | B2 * | 8/2017 | Lane | B01D 35/02 |
| 10,004,348 | B2 * | 6/2018 | Sorensen | B65D 47/0847 |
| D824,722 | S * | 8/2018 | Marina | D9/531 |
| 10,266,319 | B2 | 4/2019 | Buck | |
| 10,433,632 | B2 | 10/2019 | Resic | |
| 10,561,261 | B2 * | 2/2020 | Sorensen | B65D 81/3205 |
| 10,588,463 | B2 * | 3/2020 | Enghard | B01F 33/253 |
| 10,661,945 | B2 * | 5/2020 | Beardsell | B65D 23/04 |
| 11,089,893 | B2 * | 8/2021 | Kubota | B01D 35/02 |
| 2007/0045217 | A1 * | 3/2007 | Cho | B65D 51/285 220/709 |
| 2007/0075081 | A1 * | 4/2007 | Stokes | A47G 21/18 220/780 |
| 2011/0163102 | A1 | 7/2011 | Haynie | |
| 2011/0210126 | A1 * | 9/2011 | Vovan | A47G 19/06 220/574 |
| 2011/0220674 | A1 * | 9/2011 | Honeyghan | A47G 19/22 220/849 |
| 2012/0055862 | A1 * | 3/2012 | Parekh | C02F 1/42 210/244 |
| 2012/0285843 | A1 | 11/2012 | Devlin | |
| 2015/0329255 | A1 * | 11/2015 | Rzepecki | B65D 43/0225 222/545 |
| 2016/0137386 | A1 | 5/2016 | Pontes Garcia et al. | |
| 2017/0233136 | A1 * | 8/2017 | Cartledge | B65D 21/0228 222/130 |
| 2018/0237191 | A1 * | 8/2018 | Sorensen | B65D 51/242 |

FOREIGN PATENT DOCUMENTS

| | | |
|---|---|---|
| KR | 20180002314 | 7/2018 |
| WO | 2003106292 A1 | 12/2003 |
| WO | 2014006170 A1 | 1/2014 |

OTHER PUBLICATIONS

GOimprints "18 oz. Snack N Sip Tumbler"; https://www.goimprints.com/sample/18-oz-snack-n-sip-tumbler-551753779/?utm_source=google&utm_medium=product_search&sutm_campaign=product_sam . . . ; printed on Jul. 23, 2020; 6 pages.

WalMart; "BooginHead SippiSnack Cup with Snack Holder"; https://www.walmart.com/ip/BooginHead-SippiSnack-Cup-with-Snack-Holder-Pink-Green/145527863; printed on Jul. 23, 2020; 4 pages.

* cited by examiner

SUPPLEMENT SHAKER APPARATUS

CROSS-REFERENCE TO RELATED APPLICATIONS

The present application is a conversion of U.S. Provisional Application having U.S. Ser. No. 63/074,308, filed Sep. 3, 2020, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a supplement shaker apparatus for providing a drinking apparatus and supplement carrier in one apparatus. The supplement shaker apparatus allows a user to keep drinking fluid held in the supplement shaker apparatus and keep a supplement separated from the drinking fluid until desirable.

2. Description of the Related Art

Typically, a shaker bottle with a lid can hold a fluid and be used as a drinking apparatus for the fluid. The lid can have a hole in it for permitting fluid to flow out of the shaker bottle and a cap for sealing the hole in the lid. A supplement, such as protein powder, can be put into the shaker bottle and combined with the fluid. The mixing of the fluid and the supplement is improved by shaking the shaker bottle. Typically, the supplement has to be carried in a separate container than the shaker bottle, which causes a person who wants a protein shake to have to have to carry the shaker bottle and the supplement container with them if they want to have a protein shake and they are out and about.

Accordingly, there is a need for a supplement shaker apparatus that can provide a drinking apparatus and supplement carrier in one apparatus.

SUMMARY OF THE DISCLOSURE

The present disclosure is directed toward a supplement shaker apparatus having a primary container for holding drinking fluid and a supplement container for holding a supplement wherein the supplement container is supported by the primary container with an opening therein. The apparatus also includes a lid assembly that is securable to the primary container and holds the supplement container in position in the supplement shaker apparatus. The apparatus further includes a spout connection element that extends from the opening in the supplement container to the lid to permit the drinking fluid to pass out of the primary container without contacting the supplement in the supplement container.

The present disclosure is also directed toward a supplement shaker kit that includes a supplement container for holding a supplement wherein the supplement container is supported by a shaker bottle with an opening therein and a lid assembly that is securable to the shaker bottle and holds the supplement container in position relative to the shaker bottle. The kit also includes a spout connection element that extends from the opening in the supplement container to the lid to permit the drinking fluid to pass out of the shaker bottle without contacting the supplement in the supplement container.

DETAILED DESCRIPTION OF THE DISCLOSURE

Figure 1:
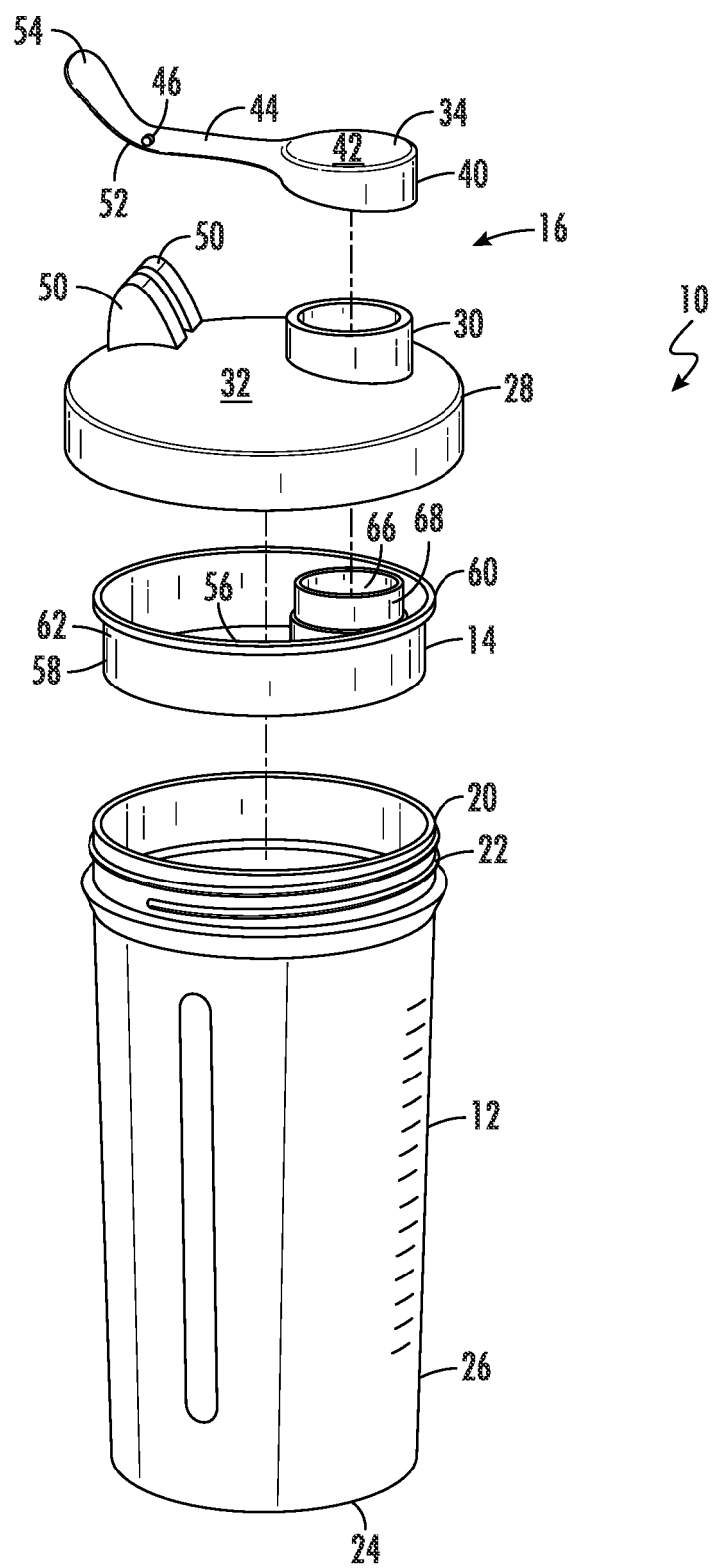
FIG. 1 is an exploded perspective view of a supplement shaker apparatus constructed in accordance with the present disclosure.
Figure 2A:
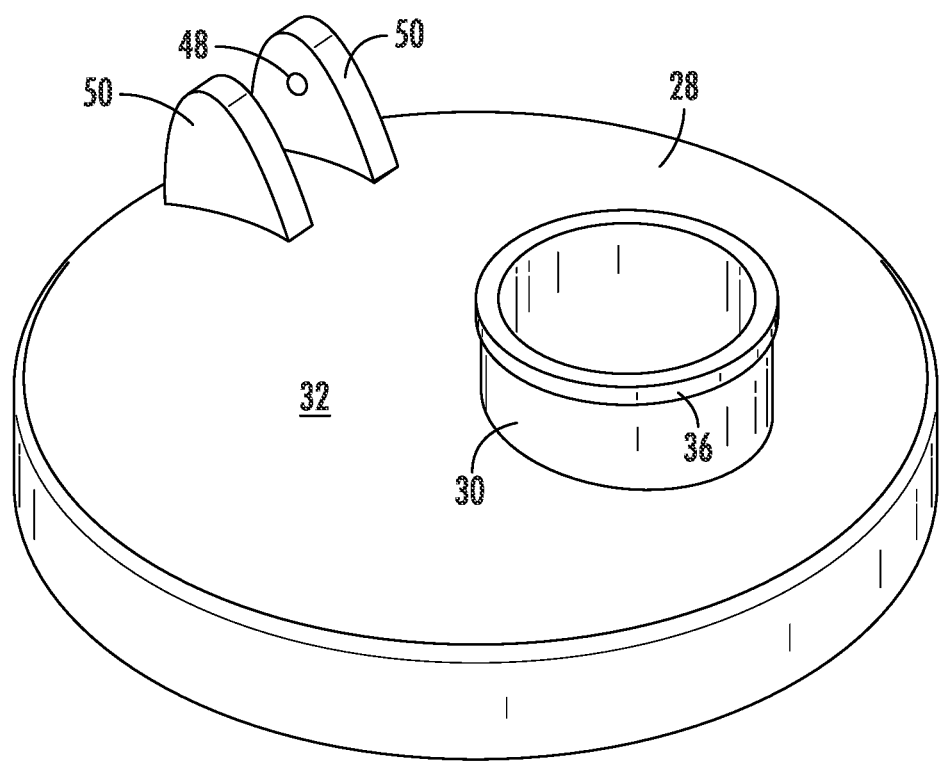
FIG. 2A is a perspective view of a portion of a lid assembly constructed in accordance with the present disclosure.
Figure 2B:
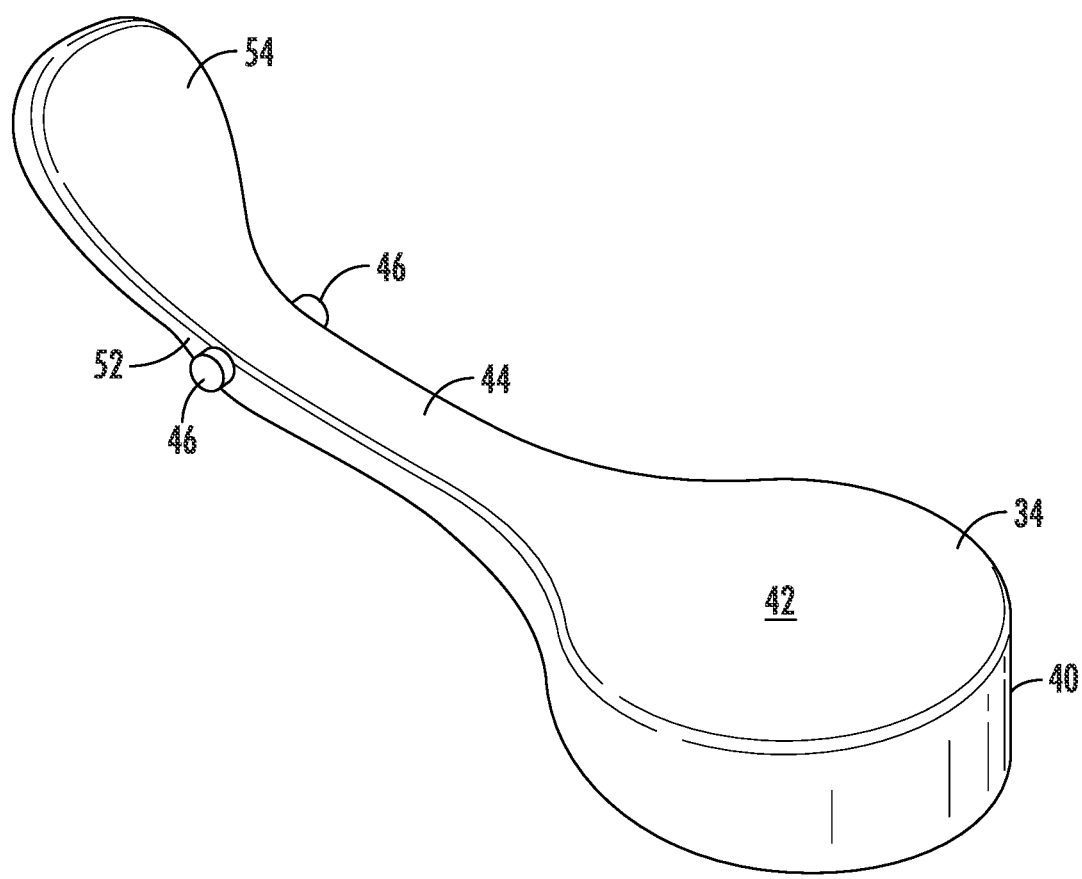
FIG. 2B is a perspective view of another portion of the lid assembly constructed in accordance with the present disclosure.
Figure 3:
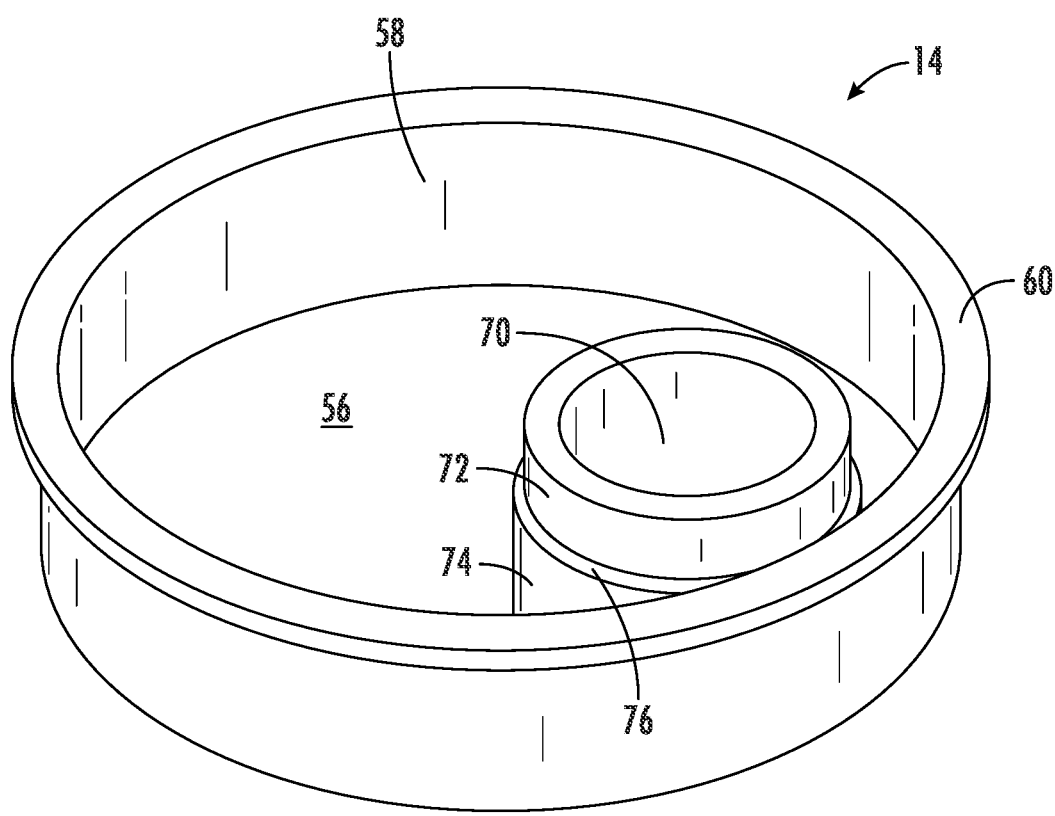
FIG. 3 is a perspective view of a supplement container of the supplement shaker apparatus constructed in accordance with the present disclosure.

The present disclosure relates to a supplement shaker apparatus 10 that can hold a drinking fluid and a supplement, such as a protein powder, separately until a user of the supplement shaker apparatus desires for the drinking fluid and the supplement to be mixed into a desired mixture. The supplement shaker apparatus 10 includes a primary container 12 for holding the drinking fluid deposited into the supplement shaker apparatus 10, a supplement container 14 for holding the supplement, and a lid assembly 16 for attaching to the primary container 12 to prevent the drinking fluid from escaping the supplement shaker apparatus 10 and holding the supplement container 14 securely in the supplement shaker apparatus 10. The lid assembly 16 can be secured to the primary container 12 in any manner known in the art so that the drinking fluid or the desired mixture do not leak from the supplement shaker apparatus 10. In one embodiment, the lid assembly 16 can have threads 18 and be screwed to a top portion 20 of the primary container 12, which has threads 22 that can cooperate with the threads 18 on the lid assembly 16 to hold the lid assembly 16 securely to the primary container 12. In another embodiment, the lid assembly 16 can snap fit onto the top portion 20 of the primary container 12 to seal the drinking fluid inside the supplement shaker apparatus 10.

The primary container 12 can be any size and shape such that it can hold drinking water and can be secured to the lid assembly 16. In one embodiment, the primary container 12 is tapered such that the bottom 24 of the primary container 12 is narrower than the top portion 20 of the primary container 12. The wider top portion 20 provides that less vertical height of the primary container 12 is needed to achieve the same volume of fluid or material as that in a lower portion 26 of the primary container 12.

The lid assembly 16 can have a lid 28 with a spout 30 that extends from a top side 32 of the lid 28 to facilitate a user drinking fluid from the supplement shaker apparatus 10. The lid assembly 16 can also include a cap 34 that is securable to the spout 30 to prevent fluid from escaping the supplement shaker apparatus 10. The cap 34 can be securable to the spout 30 in any manner known in the art. In one embodiment, the spout 30 has a lip 36 that extends outward and the cap 34 has a lip 38 that extends inward from a sleeve 40 portion that extends from a base portion 42. The lip 38 of the cap 34 is forced over the lip 36 on the spout 30 to secure the cap 34 to the spout 30. In another embodiment, the spout 30 or the cap 34 can have a recessed area that mates with the lip 36 or 38 on the spout 30 or the cap 34.

The cap 34 can also include an extension member 44 that extends from the base portion 42 of the cap 34. The extension member 44 can have protrusions 46 that extend therefrom that can be rotatably supported by holes 48 disposed in flange elements 50 that extend from the top 32 of the lid 28. The holes 48 in the two flange elements 50 are generally aligned with each other and the protrusions 46 on the extension member 44. This alignment allows the cap 34 to be rotated toward and away from the spout 30. The end 52 of the extension member 44 opposite the cap 34 can have a leverage member 54 extending at an angle therefrom to facilitate the removing and replacing of the cap 34 onto the spout 30 via the extension member 44. The leverage element 54 is designed to be engaged by a finger or thumb of the user of the supplement shaker apparatus 10.

The supplement container 14 includes a base plate 56 and a sidewall 58 that extends up from the base portion 56. The base plate 56 and sidewall 58 can be any size such that the volume of the supplement container 14 is sufficient to hold a desired amount of supplement. Further, the base plate 56 and the sidewall 58 are sized such that they can be extended down into the primary container 12 of the supplement shaker apparatus 10. The supplement container 14 can also have a flange 60 that extends outward from the top 62 of the sidewall 58. When the supplement shaker apparatus 10 is put together, the flange 60 of the supplement container 14 rests on the top 20 of the primary container 12. Securing the lid assembly 16 to the primary container 12 would also function to secure the flange 60 of the supplement container 14 to the top of the primary container 12. The underside 64 of the lid 28 of the lid assembly 16 provides a top to contribute to total containment of the supplement in the supplement container 14.

The supplement container 14 can also include an opening 66 disposed in the base plate 56 of the supplement container 14 and a spout connection element 68 extending from the opening 66 in the base plate 56 to the spout 30 on the lid 28. The spout connection element 68 creates a fluid passageway 70 that allows fluid to flow from the primary container 12, through the spout connection element 68 of the supplement container 14 and out the spout 30 of the lid 28. The height of the spout connection element 68 is greater than the height of the sidewall 58 of the supplement container 14. The spout connection element 68 has an upper portion 72 and a lower portion 74. The height of the spout connection element 68 being greater than the height of the sidewall 58 permits the upper portion 72 of the spout connection element 68 to extend up into the spout 30 on the lid 28. The extension of the spout connection element 68 up into the spout 30 on the lid 28 permits fluid to flow from the primary container 12 and out of the spout 30 without coming into contact with the supplement in the supplement container 14.

The lower portion 74 can have an outer diameter that is greater than the outer diameter of the upper portion 72. This difference in outer diameter creates a ledge 76 on the spout connection element 68 where the underside 64 of the lid 28 can engage the spout connection element 68 and prevent supplement from escaping the supplement shaker apparatus 10 between the spout connection element 68 and the inside of the spout 30 on the lid 28.

In a further embodiment of the present disclosure, a supplement shaker kit 80 is contemplated that can be used with primary containers of already purchased shaker bottlers. The supplement shaker kit 80 can include the lid assembly 16 and the supplement container 14 as described herein.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A supplement shaker apparatus, the supplement shaker apparatus comprising:
   a primary container for holding drinking fluid;
   a supplement container for holding a supplement wherein the supplement container is supported by the primary container with an opening therein;
   a lid assembly that is securable to the primary container and holds the supplement container in position in the primary container; and
   a spout connection element that extends from the opening in the supplement container to the lid to permit the drinking fluid to pass out of the primary container without contacting the supplement in the supplement container;
   wherein the lid assembly includes a spout disposed on a top side of a lid, the spout extending from an opening in the lid;
   wherein the spout connection element includes an upper portion that is narrower than a lower portion of the spout connection element to create a ledge on an outside portion of the spout connection element;
   wherein the upper portion is sized to fit within the spout on the lid and an underside part of the spout on the lid engages the ledge to prevent the fluid from entering the supplement container or supplement from escaping the supplement container.

2. The supplement shaker apparatus of claim 1 wherein the supplement container has a base portion, a sidewall that extends from the base portion, and flange that extends radially from the sidewall that can be supported by a top end of the primary container.

3. The supplement shaker apparatus of claim 1 wherein lid assembly further includes a cap for engaging the spout and preventing the fluid from escaping the supplement shaker apparatus, an extension element attached to the cap on one end and supported by flange elements that extend from the top side of the lid.

4. The supplement shaker apparatus of claim 3 wherein the extension element of the lid assembly has protrusions that extend therefrom and engage with holes disposed in the flange elements extending from the lip to permit rotatable attachment of the extension element to the lid assembly.

5. The supplement shaker apparatus of claim 4 wherein the extension element has a leverage member extending therefrom to facilitate rotation of the extension element and removing the cap from the spout.

6. The supplement shaker apparatus of claim 3 wherein the cap can include a cap lip disposed thereon to engage with a spout lip to secure the cap to the spout.

7. A supplement shaker kit, the supplement shaker kit comprising:
   a supplement container for holding a supplement wherein the supplement container is supported by the primary container with an opening therein;

a lid assembly that is securable to the primary container and holds the supplement container in position in the primary container; and a spout connection element that extends from the opening in the supplement container to the lid to permit the drinking fluid to pass out of the primary container without contacting the supplement in the supplement container;

wherein the lid assembly includes a spout disposed on a top side of a lid, the spout extending from an opening in the lid;

wherein the spout connection element includes an upper portion that is narrower than a lower portion of the spout connection element to create a ledge on an outside portion of the spout connection element;

wherein the upper portion is sized to fit within the spout on the lid and an underside part of the spout on the lid engages the ledge to prevent the fluid from entering the supplement container or supplement from escaping the supplement container.

8. The supplement shaker kit of claim 7 wherein the supplement container has a base portion, a sidewall that extends from the base portion, and flange that extends radially from the sidewall that can be supported by a top end of the primary container.

9. The supplement shaker kit of claim 7 wherein lid assembly further includes a cap for engaging the spout and preventing the fluid from escaping the supplement shaker apparatus, an extension element attached to the cap on one end and supported by flange elements that extend from the top side of the lid.

10. The supplement shaker apparatus of claim 9 wherein the extension element of the lid assembly has protrusions that extend therefrom and engage with holes disposed in the flange elements extending from the lip to permit rotatable attachment of the extension element to the lid assembly.

11. The supplement shaker kit of claim 10 wherein the extension element has a leverage member extending therefrom to facilitate rotation of the extension element and removing the cap from the spout.

12. The supplement shaker kit of claim 9 wherein the cap can include a cap lip disposed thereon to engage with a spout lip to secure the cap to the spout.

* * * * *